(12) United States Patent
Yoon et al.

(10) Patent No.: US 9,042,316 B2
(45) Date of Patent: May 26, 2015

(54) APPARATUS AND METHOD FOR GENERATING AND TRANSCEIVING REFERENCE SIGNAL IN WIRELESS COMMUNICATION SYSTEM USING PLURAL COMPONENT CARRIERS

(75) Inventors: Sungjun Yoon, Seoul (KR); Kibum Kwon, Ansan-si (KR); Kitae Kim, Suwon-si (KR)

(73) Assignee: Pantech Co., Ltd., Seoul (JP)

( * ) Notice: Subject to any disclaimer, the term of this patent is extended or adjusted under 35 U.S.C. 154(b) by 444 days.

(21) Appl. No.: 13/505,194

(22) PCT Filed: Oct. 29, 2010

(86) PCT No.: PCT/KR2010/007503
§ 371 (c)(1),
(2), (4) Date: Apr. 30, 2012

(87) PCT Pub. No.: WO2011/053032
PCT Pub. Date: May 5, 2011

(65) Prior Publication Data
US 2012/0213190 A1    Aug. 23, 2012

(30) Foreign Application Priority Data
Nov. 2, 2009    (KR) .......................... 10-2009-0105206

(51) Int. Cl.
*H04W 72/04*    (2009.01)
*H04L 27/26*    (2006.01)
*H04L 5/00*    (2006.01)
*H04L 23/02*    (2006.01)

(52) U.S. Cl.
CPC ............ *H04L 27/2613* (2013.01); *H04L 5/001* (2013.01); *H04L 5/0012* (2013.01); *H04L 5/0035* (2013.01); *H04L 5/0048* (2013.01); *H04L 23/02* (2013.01); *H04L 27/262* (2013.01)

(58) Field of Classification Search
CPC ..... H04W 72/04; H04W 4/00; H04W 72/042; H04L 5/0053; H04L 5/0047; H04L 5/0055
USPC ................................ 370/329, 328, 336, 350
See application file for complete search history.

(56) References Cited

U.S. PATENT DOCUMENTS

2009/0252260 A1    10/2009    Noh et al.

FOREIGN PATENT DOCUMENTS

WO    2008-132073    11/2008

OTHER PUBLICATIONS

International Search Report of PCT/KR2010/007503 dated Jun. 28, 2011.

*Primary Examiner* — Jamal Javaid
(74) *Attorney, Agent, or Firm* — H.C. Park & Associates, PLC

(57) ABSTRACT

The present invention relates to an apparatus and a method for composing and transmitting/receiving a reference signal in a wireless communication system that uses a plurality of component carriers (CC). In a wireless communication system using a plurality of component carriers, the present invention can reduce an increase in cubic metric (CM) and peak to average power ratio (PAPR) which occur in the course of composing and transmitting/receiving the same reference signal for each component carrier, by composing and transceiving a distinctive reference signal for each component carrier.

21 Claims, 9 Drawing Sheets

APPARATUS AND METHOD FOR GENERATING AND TRANSCEIVING REFERENCE SIGNAL IN WIRELESS COMMUNICATION SYSTEM USING PLURAL COMPONENT CARRIERS

CROSS-REFERENCE TO RELATED APPLICATIONS

This application is the National Stage Entry of International Application No. PCT/KR2010/007503, filed on Oct. 29, 2010 and claims priority from and the benefit of Korean Patent Application No. 10-2009-0105206, filed on Nov. 2, 2009, both of which are hereby incorporated by reference for all purposes as if fully set forth herein.

BACKGROUND

1. Field

The present invention relates to a wireless communication system using multiple Component Carriers (CCs), and more particularly to an apparatus and a method for generating and transmitting/receiving a reference signal.

2. Discussion of the Background

One of the most important requirements in next generation wireless communication systems is whether a requirement for a high data transmission rate can be supported.

To this end, research on various technologies, such as MIMO (Multiple Input Multiple Output), CoMP (Cooperative Multiple Point transmission and reception) and relay has been conducted. However, the most basic and stable solution is to increase a bandwidth.

However, the actual circumstances are that current frequency resources are in a saturation state and various technologies are used in one part and another of a wide frequency band.

In this regard, the actual circumstances are that the next generation wireless communication systems need more specific methods for transmitting and receiving reference signals in order to use a wide frequency band.

SUMMARY

Therefore, the present invention provides an apparatus and a method for generating and transmitting/receiving a reference signal in a wireless communication system using multiple Component Carriers (CCs).

The present invention also provides an apparatus and a method for constructing and transmitting/receiving a reference signal enabling discrimination for each component carrier in a wireless communication system.

The present invention also provides a method and an apparatus, in which a user equipment constructs and transmits a reference signal enabling discrimination for each component carrier and a base station receives the reference signal.

Further, the present invention discloses a method or a system and an apparatus, which can reduce a CM (Cubic Metric) and a PAPR (Peak to Average Power Ratio) in a wireless communication system using multiple component carriers (CCs).

In order to accomplish the above-mentioned objects, in accordance with an aspect of the present invention, there is provided a method for transmitting a reference signal in a wireless communication system using at least two component carriers. The method includes: generating a reference signal enabling discrimination for each component carrier by using a reference signal sequence enabling discrimination for each component carrier; and transmitting the reference signal enabling the discrimination for each component carrier for each relevant component carrier.

In accordance with another aspect of the present invention, there is provided a method for generating a reference signal. The method includes: in the wireless communication system using at least two component carriers, constructing a base sequence different according to each component carrier by adding a component carrier number or an offset value for each component carrier based on a Zadoff-Chu sequence; and applying a predetermined phase cyclic shift value α, which is different according to each component carrier by adding the component carrier number or the offset value for each component carrier, to the base sequence, and is generating $r_{u,v}^{(\alpha)}(n)$ corresponding to a reference signal sequence enabling discrimination for each component carrier.

In accordance with another aspect of the present invention, there is provided an apparatus for transmitting a reference signal in a wireless communication system using at least two component carriers. The apparatus includes: a reference signal generator for generating a reference signal enabling discrimination for each component carrier by using a reference signal sequence enabling discrimination for each component carrier; and a reference signal transmitter for transmitting the reference signal enabling the discrimination for each component carrier, which has been generated by the reference signal generator, for each relevant component carrier.

In accordance with another aspect of the present invention, there is provided an apparatus for receiving a reference signal in a wireless communication system using at least two component carriers. The apparatus includes: a reference signal receiver for receiving a reference signal, which is generated in such a manner as to be different according to each component carrier by using a reference signal sequence enabling discrimination for each component carrier and is transmitted, for each component carrier; and a reference information extractor for decoding the reference signal received by the reference signal receiver and extracting particular reference information.

DETAILED DESCRIPTION OF THE ILLUSTRATED EMBODIMENTS

Figure 1:
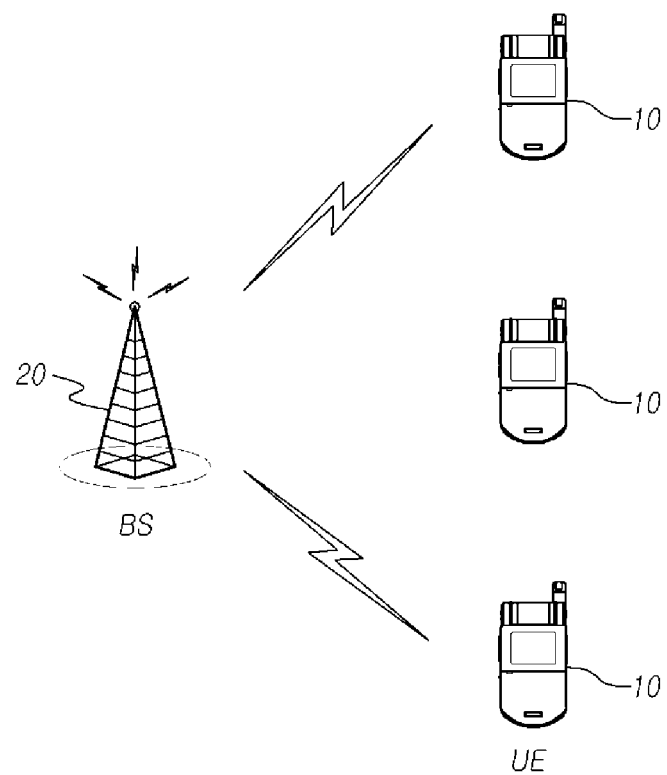
FIG. 1 is a block diagram showing a wireless communication system, to which embodiments of the present invention are applied.

Hereinafter, exemplary embodiments of the present invention will be described in detail with reference to the accompanying drawings. It should be noted that in assigning reference numerals to elements in the drawings, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be understood that if it is described in the specification that one component is "connected," "coupled" or "joined" to another component, a third component may be "connected," "coupled," and "joined" between the first and second components, although the first component may be directly connected, coupled or joined to the second component.

FIG. 1 is a block diagram showing a wireless communication system, to which embodiments of the present invention are applied.

The wireless communication system is widely arranged in order to provide various communication services, such as voice and packet data.

Referring to FIG. 1, the wireless communication system includes a User Equipment (UE) 10 and a Base Station (BS) 20.

In the present invention, the UE 10 has a comprehensive concept implying a user terminal in wireless communication. Accordingly, the UEs should be interpreted as having the concept of including a MS (Mobile Station), a UT (User Terminal), an SS (Subscriber Station), a wireless device, and the like in GSM (Global System for Mobile Communications) as well as UEs (User Equipments) in WCDMA (Wideband Code Division Multiple Access), LTE (Long Term Evolution), HSPA (High Speed Packet Access), etc.

The BS 20 or a cell usually refers to a fixed station communicating with the UE 10, and may be called by different terms, such as a Node-B, an eNB (evolved Node-B), a BTS (Base Transceiver System), and an AP (Access Point).

Namely, in the present invention, the BS 20 or the cell should be interpreted as having a comprehensive meaning indicating a partial area covered by a BS (Base Station) in CDMA (Code Division Multiple Access) or a Node-B in WCDMA (Wideband Code Division is Multiple Access). Accordingly, the BS 20 or the cell has a meaning including various coverage areas, such as a mega cell, a macro cell, a micro cell, a pico cell and a femto cell.

In the present invention, the UE 10 and the BS 20, which are two transmission and reception subjects used to implement the art or the technical idea described in this specification, are used as a comprehensive meaning, and are not limited by a particularly designated term or word.

There is no limit to multiple access schemes applied to the wireless communication system. For example, use may be made of various multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, and OFDM-CDMA.

In this respect, use may be made of a TDD (Time Division Duplex) scheme in which uplink (UL) transmission and downlink (DL) transmission are performed at different times. Otherwise, use may be made of an FDD (Frequency Division Duplex) scheme in which uplink transmission and downlink transmission are performed by using different frequencies.

An embodiment of the present invention may be applied to the allocation of resources in the field of asynchronous wireless communications which have gone through GSM, WCDMA and HSPA, and evolve into LTE (Long Term Evolution) and LTE-advanced, and in the field of synchronous wireless communications which evolve into CDMA, CDMA-2000 and UMB. The present invention should not be interpreted as being limited to or restricted by a particular wireless communication field, and should be interpreted as including all technical fields to which the spirit of the present invention can be applied.

However, the actual circumstances are that current frequency resources are in a saturation state and various technologies are used in one part and another of a wide frequency band. For this reason, in order to satisfy a requirement for a higher data transmission rate, as a way to secure a broadband bandwidth, each of separate bands is designed so as to satisfy a basic requirement such that each of separate bands can operate as an independent system. Also, a Carrier Aggregation (CA) corresponding to the concept of aggregating multiple bands into one system is introduced.

In this case, each band which can independently operate is defined as a Component Carrier (CC). Accordingly, in the next generation wireless communication systems, a broadband bandwidth is secured by using the multiple component carriers, so that it is possible to easily design a system satisfying service requirements of the next generation wireless communication systems.

As described above, because each component carrier may operate as an independent system, the UE 10 may support a normal wireless communication service through only at least one component carrier, and may simultaneously support the wireless communication service by using the multiple component carriers.

Figure 2:
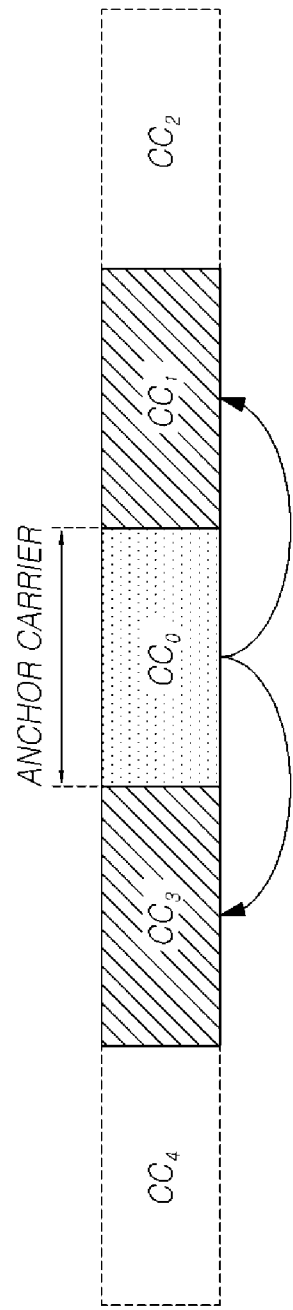
FIG. 2 is a view showing the concept of frequency extension in a carrier aggregation environment, to which the present invention is applied.

FIG. 2 which shows a wireless communication system, to which the present invention is applied, is a view explaining the concept of frequency extension in a carrier aggregation environment.

Referring to FIG. 2, the UE 10 may camp on through all component carriers CC0 to CC4.

In this case, the term "camp on" refers to a state where the UE 10 may perform communication in a particular frequency band through a process where the UE 10 establishes synchronization with the BS 20 and receives basic control information for communicating with the BS, which includes a MIB (Master Information Block) such as a PBCH (Physical Broadcast CHannel) and a SIB (System Information Block) such as a PDSCH (Physical Downlink Shared Channel).

Particularly, an SIB type 2 (SIB2) includes an uplink (UL) cell bandwidth, a random access parameter, and a UL power control parameter. Accordingly, when the UE 10 camps on the BS 20, it receives a parameter for using a RACH (Random Access CHannel).

Also, the UE 10 may basically perform random access to all the component carriers CC0 to CC4. Particularly, the UE 10 has a high possibility of first performing random access to the CC0 for LTE, which has a high possibility of becoming an anchor carrier (CC0) in the current CA environment.

Namely, in the CA environment where multiple CCs may exist, a reference CC becomes an anchor carrier as described above. As shown in FIG. 2, the anchor CC becomes a reference which notifies which carrier operates in a CA mode with the anchor carrier as the center.

The wireless communication system requires the transmission of a reference signal in order to demodulate a received signal and/or estimate a channel of the received signal. For example, in the case of a 3GPP LTE (3$^{rd}$ Generation Partnership Project Long Term Evolution) system, there exists a demodulation reference signal for demodulating a Physical Uplink Shared CHannel (PUSCH) and a Physical Uplink Control CHannel (PUCCH), which are transmitted in uplink, and a sounding reference signal which is not related to the PUSCH and the PUCCH. For both the demodulation reference signal and the sounding reference signal, an identical base sequence set may be used. In the following description, the both signals are all referred to as an "uplink reference signal (UL RS)," or are all referred to as a "reference signal (RS)" for the convenience of the description when there is no confusion.

Figure 3:
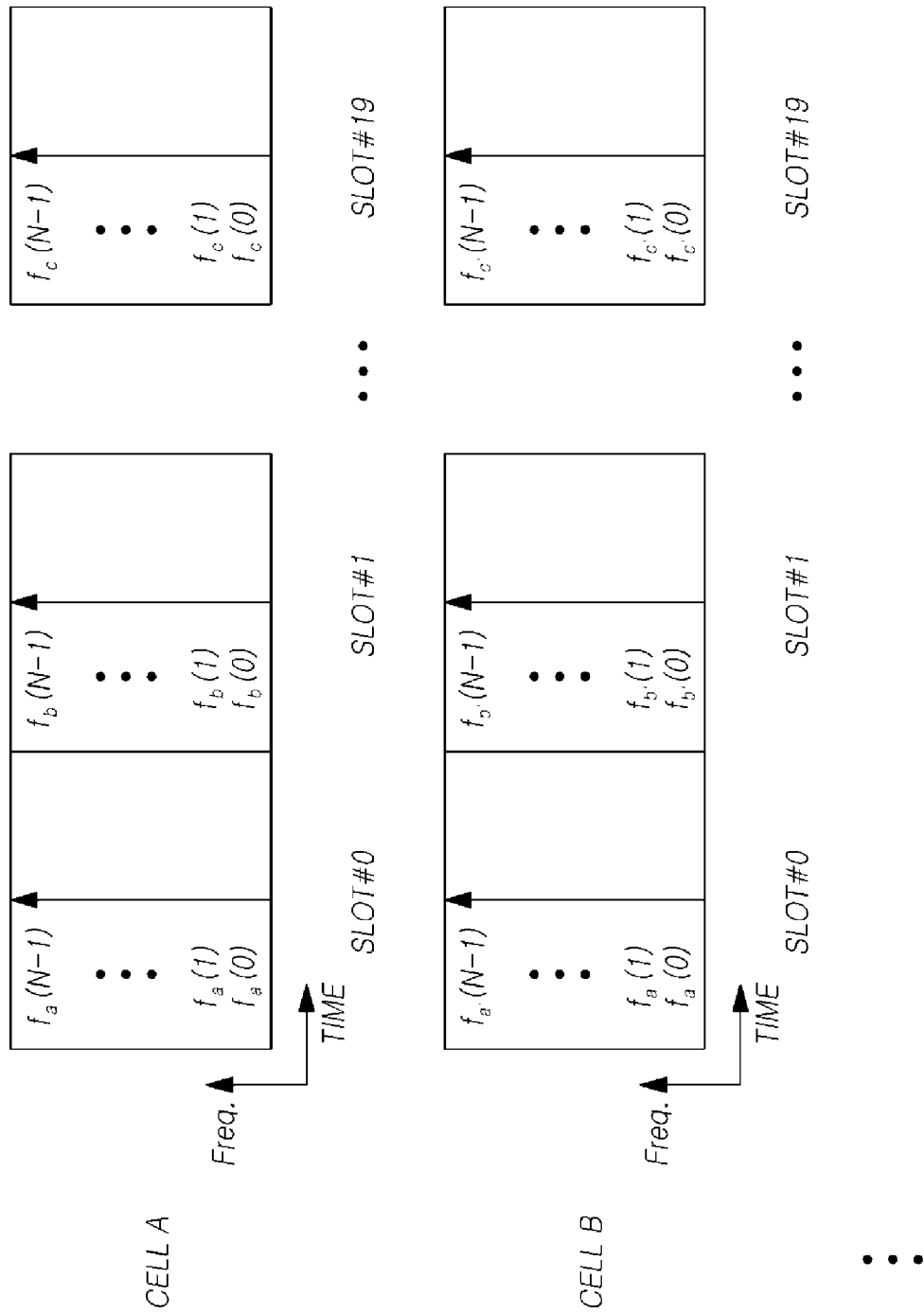
FIG. 3 is a view showing the use of reference signal sequences different according to cells in a wireless communication system using only one band.

FIG. 3 is a view showing the use of reference signal sequences different according to cells in a wireless communication system using only one band.

Referring to FIG. 3, in a wireless communication system using only one band, a Cell A and a Cell B use different reference signal sequences, for example, a reference signal sequence (fa(0), fa(1), . . . , fa(N−1)) within a first slot of the Cell A and a reference signal sequence ($f_a$(0), $f_a$(1), . . . , $f_a$(N−1)) within a first slot of the Cell B, respectively. Slots or subframes of each cell use different reference signal sequences, for example, the reference signal sequence (fa(0), fa(1), . . . , fa(N−1)) within the first slot of the Cell A and a reference signal sequence (fb(0), fb(1), . . . , fb(N−1)) within a second slot of the Cell A, respectively.

Figure 4:
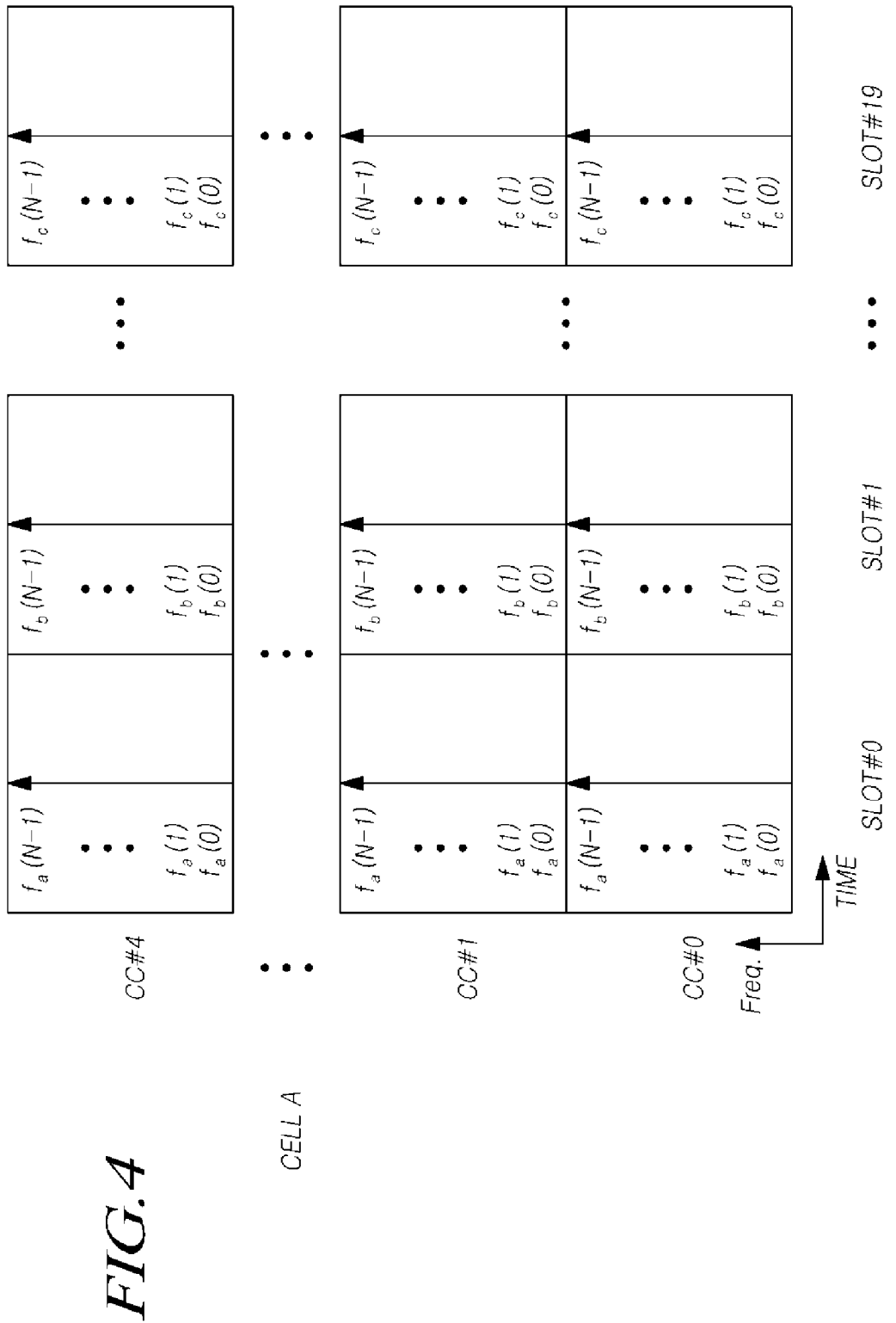
FIG. 4 is a view showing the repetition of every $N^{th}$ reference signal sequence for each component carrier in a wireless communication system using multiple component carriers.

FIG. 4 is a view showing the repetition of every N$^{th}$ reference signal sequence for each component carrier in a wireless communication system using multiple component carriers.

In this case, in regularly transmitting a Reference Signal (RS) within a partial communication resource domain in a two-dimensional (i.e. time-frequency) communication resource domain, in the case of the wireless communication system using multiple component carriers, when a reference signal is constructed in a method identical to the method for constructing a reference signal in one component carrier as shown in FIG. 3, reference signals constructed in all component carriers as shown in FIG. 4 have a periodicity.

In other words, when N reference signals are used in one subframe per component carrier, from the viewpoint of one subframe, reference signals constructed in all of the component carriers have a cycle of N, so that every N$^{th}$ reference signal of a component carrier is repeated and is then used. For example, reference signal sequences within N$^{th}$ slots of 5 component carriers of the Cell A are all (fn(0), fn(1), . . . , fn(N−1)).

Meanwhile, in the wireless communication system using multiple component carriers, when a reference signal is constructed in a method identical to the existing method for constructing a reference signal in one component carrier, reference signals constructed in all of the component carriers have a periodicity. Such a periodicity increases a CM (Cubic Metric) and a PAPR (Peak to Average Power Ratio), so as to degrade the performance of the wireless communication system.

Therefore, according to the present invention, in the wireless communication system using multiple component carriers, by constructing and transmitting/receiving a reference signal enabling discrimination for each component carrier, it is possible to reduce the problems of an increase in the CM and an increase in the PAPR, which occur in the case of constructing and transmitting/receiving an identical reference signal for each component carrier.

Figure 5:
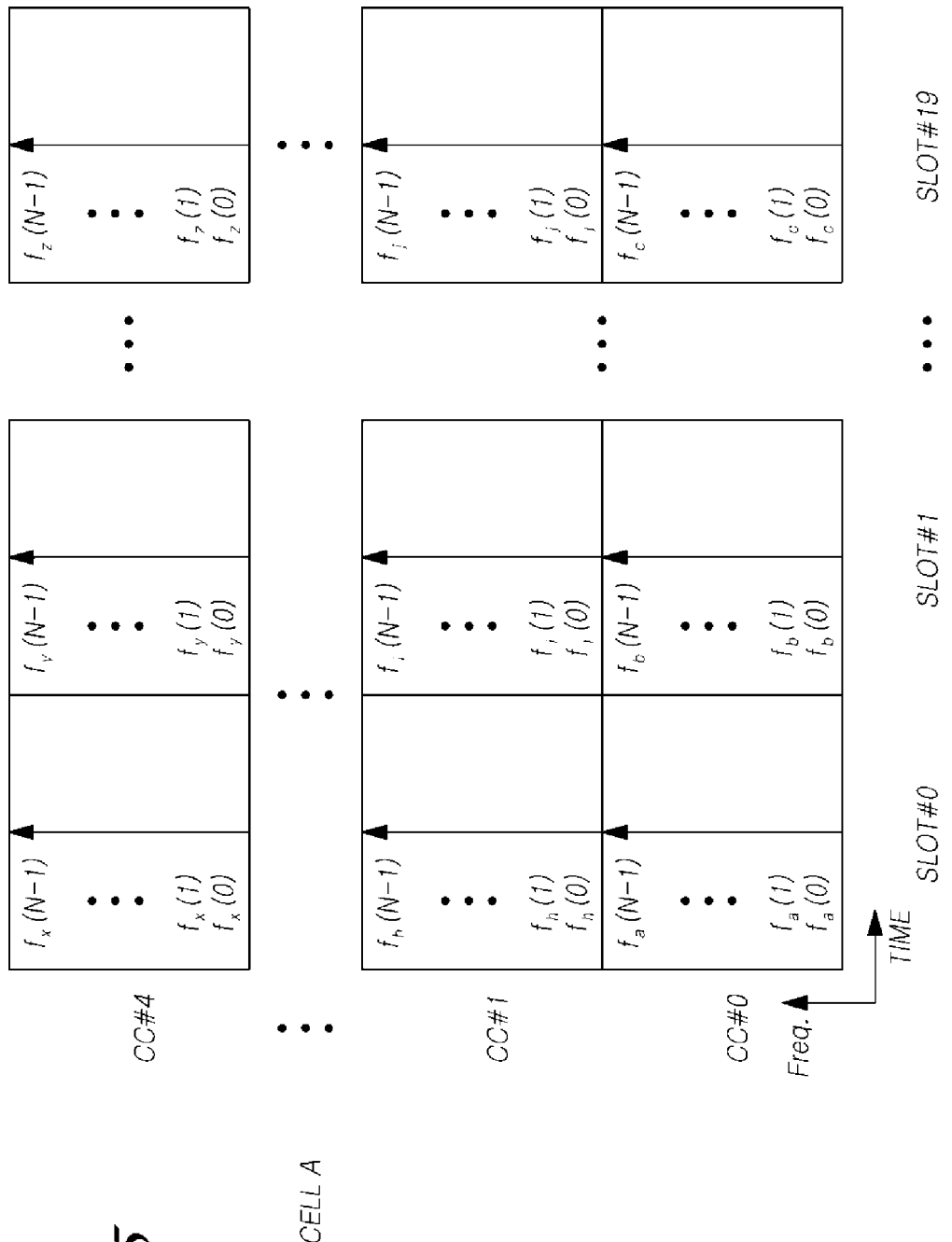
FIG. 5 is a view showing the use of reference signal sequences different according to cells and according to component carriers in a wireless communication system using multiple component carriers according to an embodiment of the present invention.

FIG. 5 is a view showing the use of reference signal sequences different according to cells and according to component carriers in a wireless communication system using multiple component carriers according to an embodiment of the present invention.

Referring to FIG. 5, the present invention proposes a method which removes the above periodicity by constructing reference signals, between which discrimination is made to according to cells and according to component carriers, in order to solve the problems of an increase in the CM and an increase in the PAPR.

In the case of uplink reference signals, i.e. both a DM-RS (DeModulation Reference Signal) and an SRS (Sounding Reference Signal), in a current LTE system, a base sequence is constructed based on a Zadoff-Chu sequence, phase cyclic shift is performed on the is constructed base sequence, and a reference signal sequence $r_{u,v}^{(\alpha)}(n)$ is constructed. The reference signal sequence $r_{u,v}^{(\alpha)}(n)$ is expressed by equation (1) below.

$$r_{u,v}^{(\alpha)}(n) = e^{j\alpha n}\bar{r}_{u,v}(n), \ 0 \leq n < M_{sc}^{RS} \quad (1)$$

In equation (1), $M_{sc}^{RS}$ representing the number of total subcarriers for reference signals is expressed by $M_{sc}^{RS} = mN_{sc}^{RB}$, $N_{sc}^{RB}$ represents the number of subcarriers per Resource Block (RB), m represents an integer ranging from 1 to the maximum number of RBs for uplink.

Also, α represents a phase cyclic shift value. In the case of a DM-RS (Demodulation Reference Signal), α has 12 values. In the case of an SRS (Sounding Reference Signal), α has 8 values.

$\bar{r}_{u,v}(n)$ represents a base sequence, and is expressed by equation (2) below.

$$\bar{r}_{u,v}(n)\chi_q(n \bmod N_{ZC}^{RS}), \ 0 \leq n < M_{sc}^{RS} \ \text{for} \ m \geq 3 \ \text{in}$$
$$M_{sc}^{RS} = mN_{sc}^{RB}, \ \text{and}$$

$$\bar{r}_{u,v}(n) = e^{j\phi(n)\pi/4}, \ 0 \leq n \leq M_{ec}^{RS} - 1 \ \text{for} \ m = 1 \ \text{or} \ 2 \ \text{in}$$
$$M_{ec}^{RS} = mN_{ec}^{RB} \quad (2)$$

In equation (2), a q$^{th}$ root Zadoff-Chu sequence $\chi_q(m)$ is expressed by equation (3) below.

$$x_q(m) = e^{-j\frac{\pi q m(m+1)}{N_{ZC}^{RS}}}, \ 0 \leq m \leq N_{ZC}^{RS} - 1 \quad (3)$$

In this case, $N_{ZC}^{RB}$ representing the length of the Zadoff-Chu sequence is the largest prime number among numbers less than $M_{sc}^{RS}$.

By using equation (3), actually different Zadoff-Chu sequences are generated. Then, a parameter which is used to construct different reference signals by constructing different base sequences based on the generated Zadoff-Chu sequences, corresponds to q. The parameter q is expressed by u and v as in equation (4) below.

$$q = +\lfloor \bar{q} + 1/2 \rfloor + v \cdot (-1)^{\lfloor 2\bar{q} \rfloor} \text{ and} \quad 5$$

$$\bar{q} = N_{ZC}^{RS} \cdot (u+1)/31 \tag{4}$$

In equation (4), a sequence group number u has 30 values, and a base sequence number v in a group has two values of 0 and 1.

Because the base sequence number v has only 2 as the number of cases with it, the number of cases with it is not large enough to be used to discriminate between component carriers. Accordingly, reference signals different according to component carriers may be constructed by causing the phase cyclic shift value α to be different according to each component carrier, or by causing the base sequences $\bar{r}_{u,v}(n)$ to be different by causing the root value q of the Zadoff-Chu sequence or the sequence group number u to be different according to each component carrier.

Herein, in order to discriminate between component carriers, when reference signals are constructed, a component carrier number or an offset value must be added for each component carrier. A component carrier (CC) number, for example, may be expressed by a parameter $N_{ID}^{CC}$. When the number of component carriers is equal to 5, the CC number is expressed by $N_{ID}^{CC} \in \{0, 1, 2, 3, 4\}$.

For each CC, an offset value: for example, may be expressed by a parameter $N_{offset}^{CC}$. When the number of component carriers is equal to 5, the offset value is also expressed by $N_{offset}^{CC} \in \{0, 1, 2, 3, 4\}$. In this case, if a CC number of a reference component carrier is expressed by $N_{ID}^{CC} = r$, an $N_{offset}^{CC}$ value of a component carrier which has a CC number expressed by $N_{ID}^{CC} = i$, is expressed by $N_{offset}^{CC} = (r+i) \mod 5$.

Accordingly, because the $N_{offset}^{CC}$, value of the reference component carrier unconditionally becomes "0," if the reference component carrier is one of a super CC, an anchor CC and a BCC (Backwards Compatible Carrier), compatibility with the existing LTE can be increased.

Otherwise, another method for defining $N_{offset}^{CC}$, in which the number of $N_{offset}^{CC}$s is set to be less than 5 although the total number of component carriers is equal to 5, may be defined as predetermined mapping rules between component carriers and $N_{offset}^{CC}$ values. In this respect, according to the method for defining $N_{offset}^{CC}$, an $N_{offset}^{CC}$ value is set to "0" when a component carrier is a BCC, whereas the $N_{offset}^{CC}$ value is set to a value which is not "0" when the component carrier is not the BCC.

For example, when five component carriers include two BCCs, the $N_{offset}^{CC}$ value of each of the two component carriers is equal to "0," and some of the remaining three component carriers which are not BCCs (i.e. Non-Backwards Compatible Carriers (NBCCs) or Extension Component Carriers) may have $N_{offset}^{CC}$ values which are all set to 1. The other component carriers excluding some of the remaining three component carriers may have $N_{offset}^{CC}$ values which are all set to 2. When the offset is set for each CC in this method, compatibility with the existing LTE can be maintained.

According to embodiments which will be described below, reference signals different according to component carriers may be constructed by using the base sequences $\bar{r}_{u,v}(n)$ which are different by causing the root value q of the Zadoff-Chu sequence or the sequence group number u to be different according to each CC by adding the CC number or the offset value for each CC, or by causing the phase cyclic shift value α to be different according to each CC by adding the CC number or the offset value for each CC.

Embodiment 1

A Method for Causing a Root Value q of a Zadoff-Chu Sequence to have a Difference By adding a CC number or an offset value for each CC to the q value as defined by equation (4), equation (4) may be rewritten as in each of equations (5A) and (5B) below.

$$q = (\lfloor \bar{q} + 1/2 \rfloor + v \cdot (-1)^{\lfloor 2\bar{q} \rfloor} + N_{ID}^{CC}) \mod N_{ZC}^{RS} \text{ and}$$

$$\bar{q} = N_{ZC}^{RS} \cdot (u+1)/31 \tag{5A}$$

$$q = (\lfloor \bar{q} + 1/2 \rfloor + v \cdot (-1)^{\lfloor 2\bar{q} \rfloor} + N_{offset}^{CC}) \mod N_{ZC}^{RS} \text{ and}$$

$$\bar{q} = N_{ZC}^{RS} \cdot (u+1)/31 \tag{5B}$$

Embodiment 2

A Method for Causing a Sequence Group Number u to have a Difference

As defined by equation (6) below, a group hopping pattern $f_{gh}(n_s)$ and a sequence shift pattern $f_{ss}$ are first added and then modulo 30 arithmetic is performed on the added $f_{gh}(n_s)$ and $f_{ss}$. Accordingly, the sequence group number u is expressed by a total of 30 values as in equation (6) below.

$$u = (f_{gh}(n_s) + f_{ss}) \mod 30 \tag{6}$$

Also, the group hopping pattern $f_{gh}(n_s)$ is expressed by equation (7) below, and an initial value of a PN sequence c(i) in equation (7) is expressed by equation (8) below.

$$f_{gh}(n_s) = \begin{cases} 0 & \text{if group hopping is disabled} \\ \left(\sum_{i=0}^{7} c(8n_s + i) \cdot 2^i\right) \mod 30 & \text{if group hopping is enabled} \end{cases} \tag{7}$$

$$c_{init} = \left\lfloor \frac{N_{ID}^{cell}}{30} \right\rfloor \tag{8}$$

In the case of a PUCCH, the sequence shift pattern $f_{ss}$ is expressed by equation (9) below. In the case of a PUSCH, the sequence shift pattern $f_{ss}$ is expressed by equation (10) below.

$$f_{ss}^{PUCCH} = N_{ID}^{cell} \mod 30 \tag{9}$$

$$f_{ss}^{PUSCH} = (f_{ss}^{PUCCH} + \Delta_{ss}) \mod 30 \tag{10}$$

Herein, $\Delta_{ss} \in \{0, 1, \ldots, 29\}$.

Embodiment 2-1

A CC number or an offset value for each CC is added directly to the u value. Namely, equation (6) may be rewritten as in each of equations (11A) and (11B) below.

$$u = (f_{gh}(n_s) + f_{ss} + N_{ID}^{CC}) \mod 30 \tag{11A}$$

$$u = (f_{gh}(n_s) + f_{ss} + N_{offset}^{CC}) \mod 30 \tag{11B}$$

Embodiment 2-2

A CC number or an offset value for each CC is added to equation (7), which expresses the $f_{gh}(n_s)$ value. Namely, equation (7) may be rewritten as in each of equations (12A) and (12B) below.

$$f_{gh}(n_s, N_{ID}^{CC}) = \tag{12A}$$
$$\begin{cases} 0 & \text{if group hopping is disabled} \\ \left(\sum_{i=0}^{7} c(160N_{ID}^{CC} + 8n_s + i) \cdot 2^i\right) \bmod 30 & \text{if group hopping is enabled} \end{cases}$$

$$f_{gh}(n_s, N_{offset}^{CC}) = \tag{12B}$$
$$\begin{cases} 0 & \text{if group hopping is disabled} \\ \left(\sum_{i=0}^{7} c(160N_{offset}^{CC} + 8n_s + i) \cdot 2^i\right) \bmod 30 & \text{if group hopping is enabled} \end{cases}$$

Figure 6:
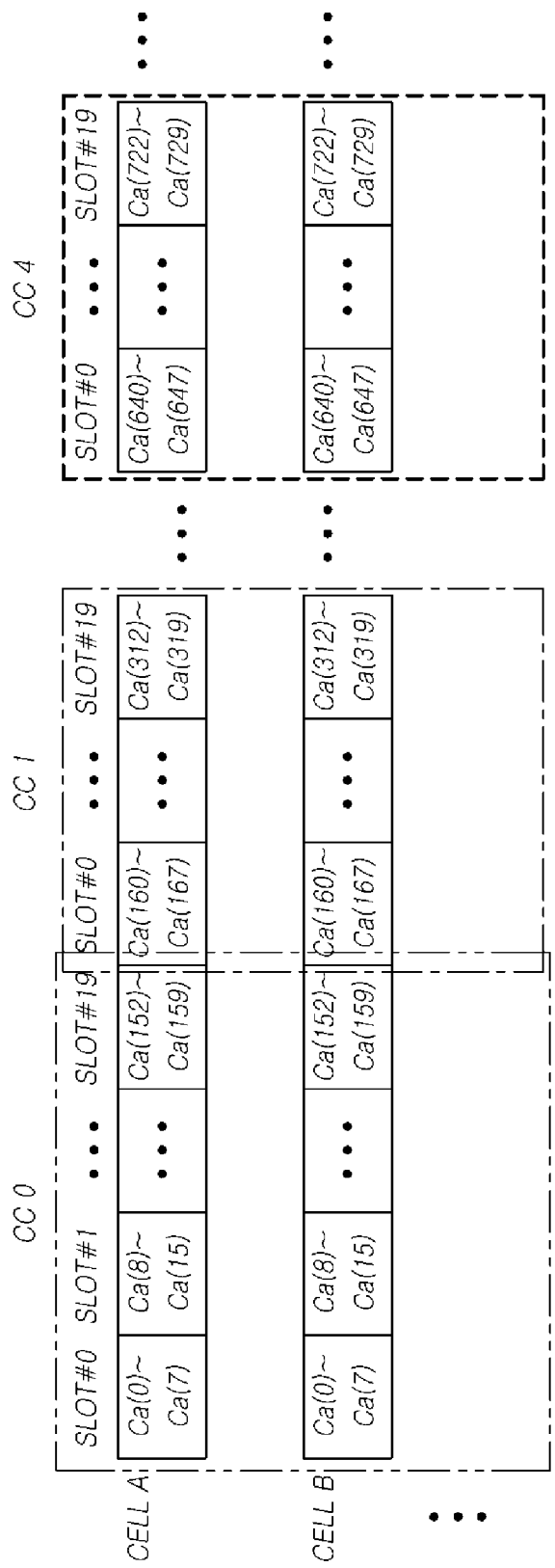
FIG. 6 is a view showing the generation of a $f_{gh}(n_s)$ value different according to each component carrier resulting from the division of 160 PN sequence c(i) values in a unit to of eight bits for each component carrier in a wireless communication system using multiple component carriers according to an embodiment of the present invention.

FIG. 6 is a view showing the generation of a $f_{gh}(n_s)$ value different according to each component carrier resulting from the division of 160 PN sequence c(i) values in a unit of eight bits for each component carrier in a wireless communication system using multiple component carriers according to an embodiment of the present invention.

As shown in FIG. 6, when the number of the existing CCs is equal to 1, a PN sequence c(i) different according to each cell is constructed, this PN sequence is divided in a unit of eight bits for each slot, modulo 30 arithmetic is performed on values ranging from 0 to 255 corresponding to decimal values of the divided eight-bit PN sequence values, and a $f_{gh}(n_s)$ value is determined for each slot.

Herein, when multiple CCs are used, after use is made of 160 different PN sequence c(i) values within a total of 20 slots in a unit of eight bits in one CC, another is set of 160 PN sequence c(i) values for the next CC are divided in a unit of eight bits, and $f_{gh}(n_s)$ values which are different not only according to slots but also according to CCs, are rendered random.

Embodiment 2-3

By adding a CC number or an offset value for each CC to equation (8), which expresses the initial value of $f_{gh}(n_s)$, equation (8) may be rewritten as in each of equations (13A) and (13B) below.

$$c_{init} = N_{ID}^{CC} \cdot 2^S + \left\lfloor \frac{N_{ID}^{cell}}{30} \right\rfloor \tag{13A}$$

$$c_{init} = N_{offset}^{CC} \cdot 2^S + \left\lfloor \frac{N_{ID}^{cell}}{30} \right\rfloor \tag{13B}$$

Embodiment 2-4

A CC number or an offset value for each CC is added to equation (9), which expresses the sequence shift pattern value $f_{ss}$. Namely, equation (9) may be rewritten as in each of equations (14A) and (14B) below.

$$f_{ss}^{PUCCH} = (N_{ID}^{cell} + N_{ID}^{CC}) \bmod 30 \tag{14A}$$

$$f_{ss}^{PUCCH} = (N_{ID}^{cell} + N_{offset}^{CC}) \bmod 30 \tag{14B}$$

Embodiment 3

A Method for Causing a Phase Cyclic Shift Value α to be Different According to Each CC (1) DM-RS for PUSCH A phase cyclic shift value of a DM-RS for a PUSCH is expressed by $\alpha = 2\pi n_{cs}/12$, $n_{cs}$ is expressed by equation (15) below.

$$n_{cs} = (n_{DMRS}^{(1)} + n_{DMRS}^{(2)} + n_{PRS}(n_s)) \bmod 12 \tag{15}$$

In equation (15), $n_{DMRS}^{(1)}$ and $n_{DMRS}^{(2)}$ are determined by a cyclic shift value descending from an upper side and a cyclic shift value for a Downlink Control Information (DCI) format 0, respectively, and $n_{PRS}(n_s)$ is expressed by equation (16) below.

$$n_{PRS}(n_s) = \sum_{i=0}^{7} c(8N_{symb}^{UL} \cdot n_s + i) \cdot 2^i \tag{16}$$

In equation (16), $N_{symb}^{UL}$ signifies the number of symbols in uplink.

In this case, an initial value of the PN sequence c(i) in equation (16) is expressed by equation (17) below.

$$c_{init} = \left\lfloor \frac{N_{ID}^{Cell}}{30} \right\rfloor \cdot 2^S + f_{ss}^{PUSCH} \tag{17}$$

Embodiment 3-1-A

A CC number or an offset value for each CC is added to the $n_{cs}$ value. Namely, equation (15) may be rewritten as in each of equations (18A) and (18B) below.

$$n_{cs} = (n_{DMRS}^{(1)} + n_{DMRS}^{(2)} + n_{PRS}(n_s) + N_{ID}^{CC}) \bmod 12 \tag{18A}$$

$$n_{cs} = (n_{DMRS}^{(1)} + n_{DMRS}^{(2)} + n_{PRS}(n_s) + N_{offset}^{CC}) \bmod 12 \tag{18B}$$

Embodiment 3-1-B

By adding a CC number or an offset value for each CC to equation (16), which expresses $n_{PRS}(n_s)$, equation (16) may be rewritten as in each of equations (19A) and (19B) below.

$$n_{PRS}(n_s, N_{ID}^{CC}) = \sum_{i=0}^{7} c(160N_{symb}^{UL} \cdot N_{ID}^{CC} + 8N_{symb}^{UL} \cdot n_s + i) \cdot 2^i \tag{19A}$$

$$n_{PRS}(n_s, N_{offset}^{cc}) = \sum_{i=0}^{7} c(160N_{symb}^{UL} \cdot N_{offset}^{CC} + 8N_{symb}^{UL} \cdot n_s + i) \cdot 2^i \tag{19B}$$

Embodiment 3-1-C

By adding a CC number or an offset value for each CC to equation (17), which expresses the initial value c(i) of $n_{PRS}(n_s)$, equation (17) may be rewritten as in each of equations (20A) and (20B) below.

$$c_{init} = N_{ID}^{CC} \cdot 2^{10} + \left\lfloor \frac{N_{ID}^{cell}}{30} \right\rfloor \cdot 2^S + f_{ss}^{PUSCH} \tag{20A}$$

$$c_{init} = N_{offset}^{CC} \cdot 2^{10} + \left\lfloor \frac{N_{ID}^{cell}}{30} \right\rfloor \cdot 2^S + f_{ss}^{PUSCH} \tag{20B}$$

(2) DM-RS for PUCCH

A phase cyclic shift value of a DM-RS for a PUCCH is expressed by $\alpha(n_s, l) = 2\pi \cdot \bar{n}_{cs}(n_s, l)/N_{sc}^{RB}$, and $\bar{n}_{cs}(n_s, l)$ is expressed by equation (21) below. Herein, $N_{sc}^{RB}$ signifies the number of subcarriers per resource block.

$$\bar{n}_{cs}(n_s, 1) = \begin{cases} [n_{cs}^{cell}(n_s, 1) + (n'(n_s) \cdot \Delta_{shift}^{PUCCH} + (\bar{n}_{oc}(n_s) \bmod \Delta_{shift}^{PUCCH})) \bmod N'] \bmod N_{sc}^{RB} \\ [n_{CS}^{cell}(n_s, 1) + (n'(n_s) \cdot \Delta_{shift}^{PUCCH} + \bar{n}_{oc}(n_s)) \bmod N''] \bmod N_{sc}^{RB} \end{cases} \quad (21)$$

In equation (21), an upper part represents a normal cyclic prefix, and a lower part represents an extended cyclic prefix. In equation (21), $\bar{n}_{oc}(n_s)$ represents an orthogonal sequence index, $\Delta_{shift}^{PUCCH}$ represents a PUCCH shift parameter descending from a system on the upper side, and $n'(n_s)$ and $N'$ represent parameters determined by setting values in a system.

The $n_{cs}^{cell}(n_s,1)$ in equation (21) may be expressed by equation (22) below.

$$n_{cs}^{cell}(n_s,l) = \Sigma_{i=0}^{7} c(8N_{symb}^{UL} \cdot n_s + 8l + i) \cdot 2^i \quad (22)$$

In this case, an initial value of the PN sequence $c(i)$ in equation (22) may be expressed by equation (23) below.

$$c_{init} = N_{ID}^{cell} \quad (23)$$

Embodiment 3-2-A

A CC number or an offset value for each CC is added to the $\bar{n}_{cs}(n_s,1)$ value. Namely, equation (21) may be rewritten as in each of equations (24A) and (24B) below.

$$(n_s, 1, N_{ID}^{CC}) = \begin{cases} [n_{cs}^{cell}(n_s, 1) + (n'(n_s) \cdot \Delta_{shift}^{PUCCH} + (\bar{n}_{oc}(n_s) \bmod \Delta_{shift}^{PUCCH})) \bmod N' + N_{ID}^{CC}] \bmod N_{sc}^{RB} \\ [n_{cs}^{cell}(n_s, 1) + (n'(n_s) \cdot \Delta_{shift}^{PUCCH} + \bar{n}_{oc}(n_s)) \bmod N' + N_{ID}^{CC}] \bmod N_{sc}^{RB} \end{cases} \quad (24A)$$

$$(n_s, 1, N_{offset}^{CC}) = \begin{cases} [n_{CS}^{cell}(n_s, 1) + (n'(n_s) \cdot \Delta_{shift}^{PUCCH} + (\bar{n}_{oc}(n_s) \bmod \Delta_{shift}^{PUCCH})) \bmod N' + N_{offset}^{CC}] \bmod N_{sc}^{RB} \\ [n_{cs}^{cell}(n_s, 1) + (n'(n_s) \cdot \Delta_{shift}^{PUCCH} + \bar{n}_{oc}(n_s)) \bmod N' + N_{offset}^{CC}] \bmod N_{sc}^{RB} \end{cases} \quad (24B)$$

In each of equation (24A) and equation (24B), an upper part represents a normal cyclic prefix, and a lower part represents an extended cyclic prefix.

Embodiment 3-2-B

By adding a CC number or an offset value for each CC to equation (22), which expresses $n_{cs}^{cell}(n_s,1)$ equation (22) may be rewritten as in each of equations (25A) and (25B) below.

$$n_{cs}^{cell}(n_s,l,N_{ID}^{CC}) = \Sigma_{i=0}^{7} c(160 N_{symb}^{UL} \cdot N_{ID}^{CC} + 8 N_{symb}^{UL} \cdot n_s + 8l + i) \cdot 2^i \quad (25A)$$

$$n_{cs}^{cell}(n_s,l,N_{offset}^{CC}) = \Sigma_{i=0}^{7} c(160 N_{symb}^{UL} \cdot N_{offset}^{CC} + 8 N_{symb}^{UL} \cdot n_s + 8l + i) \cdot 2^i \quad (25B)$$

Embodiment 3-2-C

By adding a CC number or an offset value for each CC to equation (23), which expresses the initial value of $n_{cs}^{cell}(n_s,1)$, equation (23) may be rewritten as in each of equations (26A) and (26B) below.

$$c_{init} = N_{ID}^{CC} \cdot 2^9 + N_{ID}^{cell} \quad (26A)$$

$$c_{init} = N_{offset}^{CC} \cdot 2^9 + N_{ID}^{cell} \quad (26B)$$

(3) SRS

A phase cyclic shift value of an SRS is expressed by $\alpha = 2\pi \cdot n_{SRS}^{CS}/8$ (wherein $n_{SRS}^{CS} = 0, 1, 2, 3, 4, 5, 6, 7$), and is determined by an upper side for each UE.

Embodiment 3-3

A CC number or an offset value for each CC is added directly to the $n_{SRS}^{CS}$ value. If $\alpha = 2\pi \cdot n_{SRS}^{CS}/8$ is expressed in such a manner as to reflect this addition, $\alpha = 2\pi \cdot n_{SRS}^{CS}/8$ may be rewritten as in each of equations (27A) and (27B) below.

$$\alpha = 2\pi \cdot \{(n_{SRS}^{CS} + N_{ID}^{CC}) \bmod 8\}/8 \quad (27A)$$

$$\alpha = 2\pi \cdot \{(n_{SRS}^{CS} + N_{offset}^{CC}) \bmod 8\}/8 \quad (27B)$$

As described above, the detailed description has been made of the method for generating a reference signal, which includes: in the wireless communication system using at least two component carriers, constructing a base sequence different according to each component carrier by adding a component carrier number or an offset value for each component carrier based on a Zadoff-Chu sequence; and applying a predetermined phase cyclic shift value $\alpha$, which is different according to each component carrier by adding the component carrier number or the offset value for each component carrier, to the base sequence, and generating $r_{u,v}^{(\alpha)}(n)$ corresponding to the reference signal sequence enabling discrimination for each component carrier.

Meanwhile, the reference signal as generated above is transmitted for each component carrier.

Figure 7:
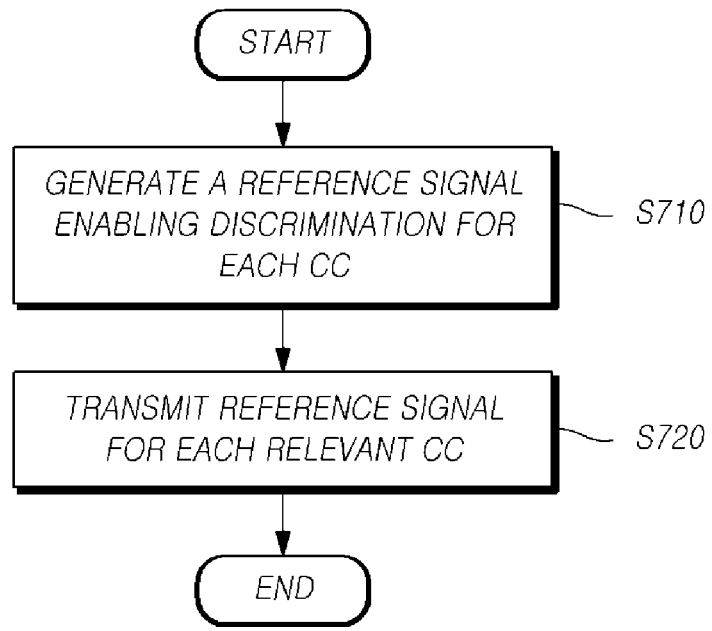
FIG. 7 is a flowchart showing the transmission of a reference signal according to an embodiment of the present invention.

FIG. 7 is a flowchart showing a process of transmitting a reference signal according to an embodiment of the present invention.

Referring to FIG. 5 and FIG. 7, in the wireless communication system using multiple component carriers, first, a reference signal different according to each cell and for each component carrier is generated by using a reference signal sequence enabling discrimination for each component carrier (S710). At this time, even within respective $N^{th}$ slots of component carriers, reference signal sequences different according to the component carriers are constructed.

For example, as shown in FIG. 5, within respective first slots, a reference signal sequence within a first slot of a CC0 may be (fa(0), fa(1), . . . , fa(N−1)), a reference signal sequence within a first slot of a CC1 may be (fh(0), fh(1), . . . , fh(N−1)), . . . , and a reference signal sequence within a first slot of a last CC4 may be (fx(0), fx(1), . . . , fx(N−1)).

Based on a reference signal sequence different according to each component carrier, a reference signal enabling discrimination for each component carrier is generated.

Then, the reference signal enabling discrimination for each component carrier is transmitted for each relevant component carrier (S720).

For example, when a reference signal is a DM-RS for a PUCCH or PUSCH and/or an SRS, the reference signal may be regularly transmitted for each component carrier within a partial communication resource domain in a two-dimensional (i.e. time-frequency) communication resource domain according to a currently-determined scheme or a scheme to be determined in the future. A scheme for regularly transmitting a reference signal for each component carrier within a partial communication resource domain in a two-dimensional (i.e. time-frequency) communication resource domain departs from the scope of the present invention, and will not be more specifically described. However, the currently-determined scheme or the scheme to be determined in the future is included in a part of the present invention.

Figure 8:
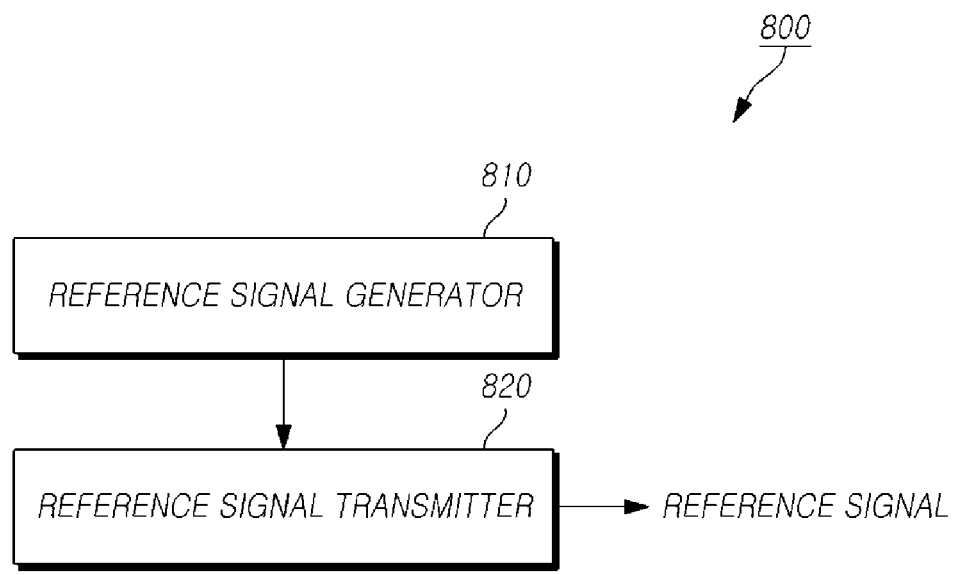
FIG. 8 is a view showing the configuration of an apparatus for transmitting a reference signal according to an embodiment of the present invention.

FIG. 8 is a view showing the configuration of an apparatus for transmitting a reference signal according to an embodiment of the present invention.

An apparatus for transmitting a reference signal according to an embodiment of the present invention generates and transmits various kinds of reference signals (which include a demodulation reference signal and a sounding reference signal but are not limited to this example) in the wireless communication system using multiple component carriers. It is desirable that the apparatus is implemented in a UE when a reference signal is an uplink reference signal, and that the apparatus is implemented in a base station (eNB) when the reference signal is a downlink reference signal. However, the present invention is not limited to this configuration.

An apparatus 800 for transmitting a reference signal according to an embodiment of the present invention may include a reference signal generator 810 and a is reference signal transmitter 820.

The reference signal generator 810 performs a function for generating a reference signal different according to each cell or for each component carrier by using a reference signal sequence enabling discrimination for each component carrier. It is desirable that the reference signal generator 810 constructs reference signal sequences different according to component carriers even within respective $N^{th}$ slots of the component carriers.

By the method for generating a reference signal by the reference signal generator 810, as described above, a base sequence is constructed based on a Zadoff-Chu sequence, phase cyclic shift is performed on the constructed base sequence, and a reference signal sequence $r_{u,v}^{(\alpha)}(n)$ is constructed. In this case, a reference signal sequence is generated by generating a Zadoff-Chu sequence different according to each component carrier and constructing different base sequences, or by causing a phase cyclic shift value α to be different according to each component carrier. Then, by using the generated reference signal sequence different according to each component carrier, a reference signal enabling discrimination for each component carrier may be generated. However, the present invention is not limited to this configuration.

In this case, in order to enable discrimination between the reference signal sequences, which have been generated by generating a Zadoff-Chu sequence different according to each component carrier and constructing different base sequences or by causing a phase cyclic shift value α to be different according to each component carrier, according to the component carriers, a component carrier number or an offset value for each component carrier may be added or may be used as a parameter. More specifically, equations (4) to (27) in Embodiments 1 to 3 as described above may be used for the above configuration.

The reference signal transmitter 820 performs a function for transmitting a reference signal enabling discrimination for each component carrier generated by the reference signal generator 810 for the relevant component carrier.

Figure 9:
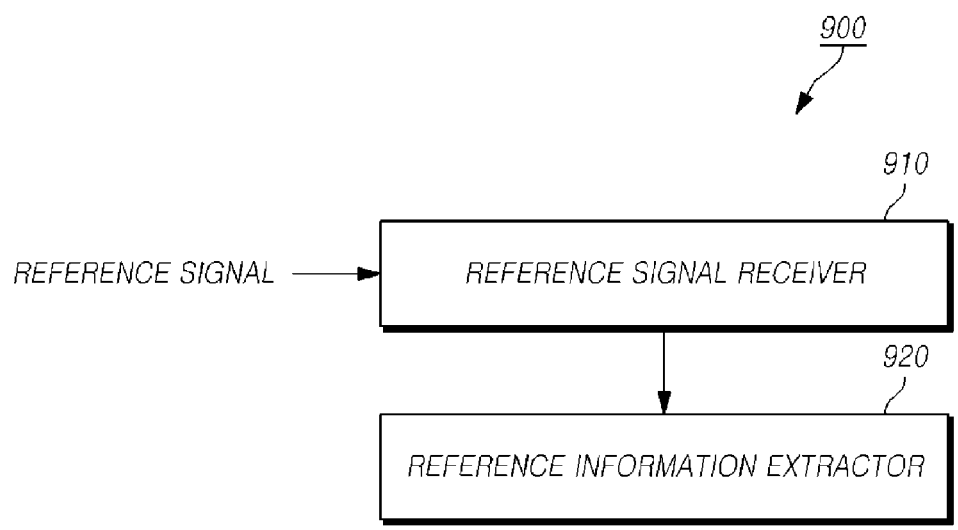
FIG. 9 is a view showing the configuration of an apparatus for receiving a reference signal according to an embodiment of the present invention.

FIG. 9 is a view showing the configuration of an apparatus for receiving a reference signal according to an embodiment of the present invention.

An apparatus 900 for receiving a reference signal according to an embodiment of the present invention may include a reference signal receiver 910 and a reference information extractor 920.

The reference signal receiver 910 receives a reference signal, which has been generated in such a manner as to be different according to each component carrier by using a reference signal sequence enabling discrimination for each component carrier and has been transmitted, for each component carrier. The reference signal different according to each component carrier as described above is transmitted by the apparatus 800 for transmitting a reference signal.

The reference information extractor 920 performs a function for decoding the reference signal received by the reference signal receiver 910 and extracting particular reference information. The particular reference information is information intended to be obtained from the reference signal. In the case of a reference signal for demodulation, the particular reference information may be demodulation information for the demodulation. In the case of a sounding reference signal, the particular reference information may be uplink channel state information, and the like. However, the present invention is not limited to this example.

As described above, although exemplary embodiments have been described with reference to the accompanying drawings, the present invention is not limited to these exemplary embodiments.

According to the exemplary embodiments as described above, reference signals different according to component carriers may be constructed by causing to the phase cyclic shift value α to be different according to each component carrier, or by using the base sequences $\bar{r}_{u,v}(n)$ different by causing the root value q of the Zadoff-Chu sequence or the sequence group number u to be different according to each component carrier. In this case, among the methods, each for constructing reference signals different according to component carriers according to the exemplary embodiments as described above, only one method may be used, or multiple methods may first be combined and may then be used.

Also, although the exemplary embodiments as described above have described only an uplink reference signal as an example, the exemplary embodiments can also be applied to a downlink reference signal in the same method.

Also, in the exemplary embodiments as described above, a CC number for each CC, for example, is expressed by the parameter $N_{ID}^{CC}$, and an offset value for each CC, for example, is expressed by the parameter $N_{offset}^{CC}$. However, it is obvious that a method for expressing each parameter may change as long as what each parameter signifies does not change.

Particularly, the CC number for each CC has a total of 5 values (i.e. $N_{ID}^{CC}=0, 1, 2, 3, 4$) when the number of component carriers is equal to 5. The offset value for each CC also has a total of 5 values (i.e. $N_{offset}^{CC}=0, 1, 2, 3, 4$) when the number of component carriers is equal to 5. In this respect, although the effect of reducing a CM and a PAPR is slightly reduced by causing the offset value for each CC to have values, the number of which is less than 5, overhead can be reduced by simplifying an added parameter.

For example, when the offset value for each component carrier is set to have 2 or 3 values, a total of 5 component carriers may be mapped to 2 to 3 groups. For example, when a reference component carrier among 5 component carriers is located in the middle of the 5 component carriers, and when 2 component carriers among the remaining 4 component carriers are physically or logically located on one side of the reference component carrier and the other 2 component carriers are physically or logically located on the other side of the reference component carrier, an offset value of the reference component carrier may be set to "0," offset values of 2 component carriers adjacent to the reference component carrier may be all set to 1, and offset values of 2 component carriers located at both ends of the reference component carrier may be all set to 2.

Also, although a case has been described as an example where the number of multiple component carriers is equal to 5 in the exemplary embodiments as described above, it is also obvious that the number of multiple component carriers may become smaller or larger according to a system.

Further, although the above exemplary embodiments have described that reference signals different according to component carriers are constructed by causing the phase cyclic shift value α to be different according to each component carrier or by causing the root value q of the Zadoff-Chu sequence or the sequence group number u to be different according to each component carrier and causing the base sequence $\bar{r}_{u,v}(n)$ to be different according to each component carrier, the present invention is not limited to these exemplary embodiments. Accordingly, in a similar manner, a signal sequence other than the reference signal may first be generated, and then signals different according to component carriers may be constructed and generated. In this case, although a base sequence may be a Zadoff-Chu sequence, any sequence or any CAZAC (Constant Amplitude Zero Auto-Correlation) sequence may be used as the base sequence.

Although it has been described in the above that all the components of an embodiment of the present invention are coupled as a single unit or coupled to be operated as a single unit, the present invention is not necessarily limited to such an embodiment. Namely, within the purpose of the present invention, one or more components among the components may be selectively coupled to be operated as one or more units. Also, although each of the components may be implemented as an independent hardware, some or all of the components may be selectively combined with each other, so that they may be implemented as a computer program having one or more program modules for performing some or all of the functions combined in one or more hardwares. Codes and code segments forming the computer program can be easily conceived by an ordinarily skilled person in the technical field of the present invention. Such a computer program may implement the embodiments of the present invention by being stored in a computer-readable medium, and being read and executed by the computer. Storage mediums for storing the computer program may include a magnetic recording medium, an optical recording medium, a carrier wave medium, etc.

Although the above description is only an illustrative description of the technical idea of the present invention, those having ordinary knowledge in the technical field of the present invention will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the technical idea of the present invention is not limited by the embodiments. The protection scope of the present invention should be construed based on the accompanying claims, and all of the technical ideas included within the scope equivalent to the claims should be construed as being included within the right scope of the present invention.

The invention claimed is:

1. A method for transmitting a reference signal in a wireless communication system using at least two component carriers, the method comprising:

generating a reference signal enabling discrimination for each component carrier by using a reference signal sequence enabling discrimination for each component carrier; and transmitting the reference signal enabling the discrimination for each component carrier for each relevant component carrier, wherein, in generating of the reference signal, a base sequence is constructed based on a Zadoff-Chu sequence, phase cyclic shift is performed on the constructed base sequence, and a reference signal sequence $r_{u,v}^{(\alpha)}(n)$ is constructed, wherein the reference signal enabling the discrimination for each component carrier is generated by using the reference signal sequence, which is generated by generating the Zadoff-Chu sequence different according to each component carrier and constructing the different base sequences, or by causing a phase cyclic shift value α to be different according to each component carrier.

2. The method as claimed in claim 1, wherein generating of the Zadoff-Chu sequence different according to each component carrier and constructing of the different base sequences comprises: generating the base sequences $r_{u,v}^{(\alpha)}(n)$, which are different by causing a root value q of the Zadoff-Chu sequence or a sequence group number u constructing the root value q of the Zadoff-Chu sequence to have a difference by adding a component carrier number or an offset value for each component carrier.

3. The method as claimed in claim 2, wherein the root value q of the Zadoff-Chu sequence different according to each component carrier by adding the component carrier number or the offset value for each component carrier is expressed by $$q=(\lfloor \bar{q}+\tfrac{1}{2} \rfloor + v \cdot (-1)^{\lfloor 2\bar{q} \rfloor}+N^{CC}) \bmod N_{ZC}^{RS} \text{ and}$$

$$\bar{q}=N_{ZC}^{RS} \cdot (u+1)/31,$$

wherein u represents a sequence group number, v represents a base sequence number in a relevant group, $N^{CC}$ represents each component carrier number or the offset value for each component carrier, and $N_{ZC}^{RS}$ represents a length of the Zadoff-Chu sequence.

4. The method as claimed in claim 2, wherein the sequence group number u different according to each component carrier by adding the component carrier number or the offset value for each component carrier is expressed by $$u=(f_{gh}(n_s)+f_{ss}+N^{CC}) \bmod 30,$$

wherein $f_{gh}(n_s)$ represents a group hopping pattern, $f_{ss}$ represents a sequence shift pattern, and $N^{CC}$ represents each component carrier number or the offset value for each component carrier.

5. The method as claimed in claim 2, wherein the sequence group number u different according to each component carrier by adding the component carrier number or the offset value for each component carrier is expressed by $$u=(f_{gh}(n_s,N_{ID}^{CC})+f_{ss}) \bmod 30,$$

wherein $f_{ss}$ represents a sequence shift pattern, $N^{CC}$ represents each component carrier number or the offset value for each component carrier, and $f_{gh}(n_s, N_{ID}^{CC})$ represents a group hopping pattern expressed by $$f_{gh}(n_s, N^{CC}) = \begin{cases} 0 & \text{if group hopping is disabled} \\ \left(\sum_{i=0}^{7} c(160N^{CC} + 8n_s + i) \cdot 2^i\right) \bmod 30 & \text{if group hopping is enabled.} \end{cases}$$

6. The method as claimed in claim 2, wherein the sequence group number u different according to each component carrier by adding the component carrier number or the offset value for each component carrier is expressed by $$u=(f_{gh}(n_s)+f_{ss}) \bmod 30,$$

wherein $f_{ss}$ represents a sequence shift pattern, and $f_{gh}(n_s)$ represents a group hopping pattern expressed by $$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled,} \end{cases}$$

wherein an initial value of $f_{gh}(n_s)$ is expressed by $$c_{init} = N^{CC} \cdot 2^s + \left\lfloor \frac{N_{ID}^{cell}}{30} \right\rfloor,$$

wherein $N^{CC}$ represents each component carrier number or the offset value for each component carrier, and $N_{ID}^{cell}$ represents a cell identifier (ID).

7. The method as claimed in claim 2, wherein the reference signal corresponds to a reference signal for a physical uplink control channel (PUCCH), and the sequence group number u different according to each component carrier by adding the component carrier number or the offset value for each component carrier is expressed by $$u=(f_{gh}(n_s)+f_{ss}) \bmod 30,$$

wherein $f_{gh}(n_s)$ represents a group hopping pattern,
and $f_{ss}$ represents a sequence shift pattern expressed by $f_{ss}^{PUCCH}=(N_{ID}^{cell}+N^{CC}) \bmod 30$,
wherein $N^{CC}$ represents each component carrier number or the offset value for component carrier, and $N_{ID}^{cell}$ represents a cell identifier (ID).

8. The method as claimed in claim 1, wherein, in generating of the reference signal, the reference signal enabling the discrimination for each component carrier is generated by using the reference signal sequence generated by causing the phase cyclic shift value α to be different according to each component carrier by adding the component carrier number or the offset value for each component carrier.

9. The method as claimed in claim 8, wherein the reference signal corresponds to a demodulation reference signal (DM-RS) for a physical uplink shared channel (PUSCH), and the phase cyclic shift value α different according to each component carrier by adding the component carrier number or the offset value for each component carrier, is expressed by $\alpha=2\pi n_{cs}/12$, wherein $n_{cs}$ is expressed by $n_{cs}=(n_{DMRS}^{(1)}+n_{DMRS}^{(2)}+n_{PRS}(n_s)+N^{CC}) \bmod 12$, wherein $n_{DMRS}^{(1)}$ and $n_{DMRS}^{(2)}$ are determined by a cyclic shift value descending from an upper side and a cyclic shift value for a downlink control information (DCI) format 0, respectively, $N^{CC}$ represents each component carrier number or the offset value for each component carrier, and $n_{PRS}(n_s)$ is expressed by $n_{PRS}(n_s)=\Sigma_{i=0}^{7} c(8N_{symb}^{UL} \cdot n_s+i) \cdot 2^i$, wherein $N_{symb}^{UL}$ signifies the number of symbols in uplink.

10. The method as claimed in claim 8, wherein the reference signal corresponds to a DM-RS for a PUSCH, and the phase cyclic shift value α different according to each component carrier by adding the component carrier number or the offset value for each component carrier, is expressed by $\alpha=2\pi n_{cs}/12$, wherein $n_{cs}$ is expressed by $n_{cs}=(n_{DMRS}^{(1)}+n_{DMRS}^{(2)}+n_{PRS}(n_s)) \bmod 12$, wherein $n_{DMRS}^{(1)}$ and $n_{DMRS}^{(2)}$ are determined by a cyclic shift value descending from an upper side and a cyclic shift value for a DCI format 0, respectively, and $n_{PRS}(n_s)$ is expressed by $n_{PRS}(n_s, N^{CC})=\Sigma_{i=0}^{7} c(160N_{symb}^{UL} \cdot N^{CC}+8N_{symb}^{UL} \cdot n_s+i) \cdot 2^i$, wherein $N_{symb}^{UL}$ signifies the number of symbols in uplink, and $N^{CC}$ represents each component carrier number or the offset value for each component carrier.

11. The method as claimed in claim 8, wherein the reference signal corresponds to a DM-RS for a PUSCH, and the phase cyclic shift value α different according to each component carrier by adding the component carrier number or the offset value for each component carrier, is expressed by $\alpha=2\pi n_{cs}/12$, wherein $n_{cs}$ is expressed by $n_{cs}=(n_{DMRS}^{(1)}+n_{DMRS}^{(2)}+n_{PRS}(n_s)) \bmod 12$, wherein $n_{DMRS}^{(1)}$ and $n_{DMRS}^{(2)}$ are determined by a cyclic shift value descending from an upper side and a cyclic shift value for a DCI format 0, respectively, and $n_{PRS}(n_s)$ is expressed by $n_{PRS}(n_s)=\Sigma_{i=0}^{7} c(8N_{symb}^{UL} \cdot n_s+i) \cdot 2^i$, wherein $N_{symb}^{UL}$ signifies the number of symbols in uplink, and an initial value c(i) is expressed by $$c_{init} = N^{CC} \cdot 2^{10} + \left\lfloor \frac{N_{ID}^{cell}}{30} \right\rfloor \cdot 2^s + f_{ss}^{PUSCH},$$

wherein $N^{CC}$ represents each component carrier number or the offset value for each component carrier, $N_{ID}^{cell}$ represents a cell ID, and $f_{ss}^{PUSCH}$ represents a sequence shift pattern for a PUSCH.

12. The method as claimed in claim 8, wherein the reference signal corresponds to a demodulation reference signal (DM-RS) for a physical uplink control channel (PUCCH), and the phase cyclic shift value α different according to each component carrier by adding the component carrier number or the offset value for each component carrier, is expressed by $\alpha(n_s,l)=2\pi \cdot \bar{n}_{cs}(n_s,l)/N_{sc}^{RB}$, wherein $N_{sc}^{RB}$ signifies the number of subcarriers per resource block, and $\bar{n}_{cs}(n_s,l)$ is expressed by $$\bar{n}_{cs}(n_s, l, N^{CC}) = \begin{cases} [n_{cs}^{cell}(n_s, l) + (n'(n_s) \cdot \Delta_{shift}^{PUCCH} + (\bar{n}_{oc}(n_s) \bmod \Delta_{shift}^{PUCCH})) \bmod N' + N^{CC}] \bmod N_{sc}^{RB} \\ [n_{cs}^{cell}(n_s, l) + (n'(n_s) \cdot \Delta_{shift}^{PUCCH} + \bar{n}_{oc}(n_s)) \bmod N' + N^{CC}] \bmod N_{sc}^{RB}, \end{cases}$$

wherein an upper part represents a normal cyclic prefix, a lower part represents an extended cyclic prefix, $\bar{n}_{oc}(n_s)$ represents an orthogonal sequence index, $\Delta_{shift}^{PUCCH}$ represents a PUCCH shift parameter descending from a system on an upper side, $n'(n_s)$ and N' represent parameters determined by setting values in a system, $N^{CC}$ represents each component carrier number or the offset value for each component carrier, and $n_{cs}^{cell}(n_s,l)$ is expressed by $$n_{cs}^{cell}(n_s,l) = \Sigma_{i=0}^{7} c(8 N_{symb}^{UL} \cdot n_s + 8l + i) \cdot 2^i,$$

wherein $N_{symb}^{UL}$ signifies the number of symbols in uplink.

13. The method as claimed in claim 8, wherein the reference signal corresponds to a DM-RS for a PUCCH, and the phase cyclic shift value α different according to each component carrier by adding the component carrier number or the offset value for each component carrier, is expressed by $\alpha(n_s,l) = 2\pi \cdot \bar{n}_{cs}(n_s,l)/N_{sc}^{RB}$,
wherein $N_{sc}^{RB}$ signifies the number of subcarriers per resource block, and $\bar{n}_{cs}(n_s,l)$ is expressed by $$\bar{n}_{cs}(n_s, 1) = \begin{cases} [n_{cs}^{cell}(n_s, 1) + (n'(n_s) \cdot \Delta_{shift}^{PUCCH} + (\bar{n}_{oc}(n_s) \bmod \Delta_{shift}^{PUCCH})) \bmod N'] \bmod N_{sc}^{RB} \\ [n_{CS}^{cell}(n_s, 1) + (n'(n_s) \cdot \Delta_{shift}^{PUCCH} + \bar{n}_{oc}(n_s)) \bmod N''] \bmod N_{sc}^{RB}, \end{cases}$$

wherein an upper part represents a normal cyclic prefix, a lower part represents an extended cyclic prefix, $\bar{n}_{oc}(n_s)$ represents an orthogonal sequence index, $\Delta_{shift}^{PUCCH}$ represents a PUCCH shift parameter descending from a system on an upper side, $n'(n_s)$ and N' represent parameters determined by setting values in a system, and $n_{cs}^{cell}(n_s,l)$ is expressed by $$n_{cs}^{cell}(n_s,l,N^{CC}) = \Sigma_{i=0}^{7} c(160 N_{symb}^{UL} \cdot N^{CC} + 8 N_{symb}^{UL} \cdot n_s + 8l + i) \cdot 2^i,$$

wherein $N_{symb}^{UL}$ signifies the number of symbols in uplink, and $N^{CC}$ represents each component carrier number or the offset value for each component carrier.

14. The method as claimed in claim 8, wherein the reference signal corresponds to a DM-RS for a PUCCH, and the phase cyclic shift value α different according to each component carrier by adding the component carrier number or the offset value for each component carrier, is expressed by $\alpha(n_s,l) = 2\pi \cdot \bar{n}_{cs}(n_s,l)/N_{sc}^{RB}$,
wherein $N_{sc}^{RB}$ signifies the number of subcarriers per resource block, and $\bar{n}_{cs}(n_s,l)$ is expressed by $$\bar{n}_{cs}(n_s, 1) = \begin{cases} [n_{cs}^{cell}(n_s, l) + (n'(n_s) \cdot \Delta_{shift}^{PUCCH} + (\bar{n}_{oc}(n_s) \bmod \Delta_{shift}^{PUCCH})) \bmod N'] \bmod N_{sc}^{RB} \\ [n_{cs}^{cell}(n_s, 1) + (n'(n_s) \cdot \Delta_{shift}^{PUCCH} + \bar{n}_{oc}(n_s)) \bmod N''] \bmod N_{sc}^{RB}, \end{cases}$$

wherein an upper part represents a normal cyclic prefix, a lower part represents an extended cyclic prefix, $\bar{n}_{OS}(n_s)$ represents an orthogonal sequence index, $\Delta_{shift}^{PUCCH}$ represents a PUCCH shift parameter descending from a system on an upper side, $n'(n_s)$ and N' represent parameters determined by setting values in a system, and $n_{cs}^{cell}(n_s,l)$ is expressed by $n_{cs}^{cell}(n_s,l) = \Sigma_{i=0}^{7} c(8 N_{symb}^{UL} \cdot n_s + 8l + i) \cdot 2^i$, wherein $N_{symb}^{UL}$ signifies the number of symbols in uplink, and an initial value is expressed by $c_{init} = N^{CC} \cdot 2^9 + N_{ID}^{cell}$,
wherein $N^{CC}$ represents each component carrier number or the offset value for each component carrier, and $N_{ID}^{cell}$ represents a cell ID.

15. The method as claimed in claim 8, wherein the reference signal corresponds to a sounding reference signal (SRS), and the phase cyclic shift value α different according to each component carrier by adding the component carrier number or the offset value for each component carrier, is expressed by $\alpha = 2\pi \cdot \{(n_{SRS}^{CS} + N^{CC}) \bmod 8\}/8$,
wherein $n_{SRS}^{CS}$ has a value determined as one of 0, 1, 2, 3, 4, 5, 6 and 7 by an upper side, and $N^{CC}$ represents each component carrier number or the offset value for each component carrier.

16. An apparatus for transmitting a reference signal in a wireless communication system using at least two component carriers, the apparatus comprising:
a reference signal generator for generating a reference signal enabling discrimination for each component carrier by using a reference signal sequence enabling discrimination for each component carrier; and
a reference signal transmitter for transmitting the reference signal enabling the discrimination for each component carrier, which has been generated by the reference signal generator, for each relevant component carrier,
wherein the reference signal generator configures a base sequence based on a Zadoff-Chu sequence, performs phase cyclic shift on the constructed base sequence, and constructs a reference signal sequence $r_{u,v}^{(\alpha)}(n)$, and
the reference signal generator generates the reference signal enabling the discrimination for each component carrier by using the reference signal sequence, which is generated by generating the Zadoff-Chu sequence different according to each component carrier and constructing the different base sequences, or by causing a phase cyclic shift value α to be different according to each component carrier.

17. The apparatus as claimed in claim 16, wherein the reference signal generator generates the reference signal enabling the discrimination for each component carrier by using a reference signal sequence, which is generated by constructing a base sequence different according to each component carrier by adding a component carrier number or an offset value for each component carrier based on the Zadoff-Chu sequence, or by causing a phase cyclic shift value α to be different according to each component carrier by adding the component carrier number or the offset value for each component carrier.

18. The apparatus as claimed in claim 16, wherein the reference signal generator generates the base sequences, which are different by causing a root value q of the Zadoff-Chu sequence or a sequence group number u constructing the root value q of the Zadoff-Chu sequence to have a difference by adding the component carrier number or the offset value for each component carrier.

19. An apparatus for receiving a reference signal in a wireless communication system using at least two component carriers, the apparatus comprising:
a reference signal receiver for receiving a reference signal, which is generated in such a manner as to be different according to each component carrier by using a reference signal sequence enabling discrimination for each component carrier and is transmitted, for each component carrier; and a reference information extractor for decoding the reference signal received by the reference signal receiver and extracting particular reference information,
wherein from the reference signal, the reference signal receiver configures a base sequence based on a Zadoff-Chu sequence, performs phase cyclic shift on the constructed base sequence, and constructs a reference signal sequence $r_{u,v}^{(\alpha)}(n)$, and
the reference signal receiver identifies the reference signal enabling the discrimination for each component carrier generated by using the reference signal sequence, which is generated by generating the Zadoff-Chu sequence different according to each component carrier and constructing the different base sequences, or by causing a phase cyclic shift value $\alpha$ to be different according to each component carrier.

20. The apparatus as claimed in claim 19, wherein the reference signal receiver identifies the reference signal enabling the discrimination for each component carrier generated by using a reference signal sequence, which is generated by constructing a base sequence different according to each component carrier by adding a component carrier number or an offset value for each component carrier based on the Zadoff-Chu sequence, or by causing a phase cyclic shift value $\alpha$ to be different according to each component carrier by adding the component carrier number or the offset value for each component carrier.

21. The apparatus as claimed in claim 20, wherein the reference signal receiver identifies the reference signals generated by using the base sequences which are different by causing a root value q of the Zadoff-Chu sequence or a sequence group number u constructing the root value q of the Zadoff-Chu sequence to have a difference by adding the component carrier number or the offset value for each component carrier.

* * * * *